United States Patent
Goodson et al.

[11] Patent Number: 5,844,940
[45] Date of Patent: Dec. 1, 1998

[54] METHOD AND APPARATUS FOR DETERMINING TRANSMIT POWER LEVELS FOR DATA TRANSMISSION AND RECEPTION

[75] Inventors: Richard L. Goodson, Huntsville; Mickey C. Rushing, Harvest; Gary D. Hunt, Gurley, all of Ala.

[73] Assignee: Motorola, Inc., Schaumburg, Ill.

[21] Appl. No.: 496,988

[22] Filed: Jun. 30, 1995

[51] Int. Cl.$^6$ .................................................. H04B 1/38
[52] U.S. Cl. .......................................... 375/222; 375/224
[58] Field of Search .................................. 375/222, 227, 375/223, 224; 370/13, 15, 17; 379/27.6, 30; 455/67.1, 67.4

[56] References Cited

U.S. PATENT DOCUMENTS

5,048,054  9/1991  Eyuhoglu et al. ........................ 375/222
5,515,398  5/1996  Walsh et al. ............................ 375/222

*Primary Examiner*—Stephen Chin
*Assistant Examiner*—Kevin Kim
*Attorney, Agent, or Firm*—Nancy R. Gamburd

[57] ABSTRACT

An apparatus and method for a data communications device such as a modem (100, 101) to determine transmit power levels for data transmission and reception, from a received probe signal. The various embodiments utilizing a processor (108) or a digital signal processor (106) receive a probe signal, transmitted at two different power levels, which also typically contains noise and other distortions. The various method and apparatus embodiments then determine average signal levels (501), average noise levels (503), and a set of signal to distortion ratios corresponding to combinations of symbol rates and carrier frequencies. Parameters such as the receive signal power (509), the harmonic content (507), the proportional noise (511), and a signal to distortion ratio threshold (513) are utilized to determine a transmit power level (515).

20 Claims, 3 Drawing Sheets

METHOD AND APPARATUS FOR DETERMINING TRANSMIT POWER LEVELS FOR DATA TRANSMISSION AND RECEPTION

FIELD OF THE INVENTION

This invention relates in general to data communications devices and, more particularly, to an apparatus and method for the determination of transmit power levels for data transmission and reception.

BACKGROUND OF THE INVENTION

Presently, data communications devices ("DCDs") and other data communications equipment ("DCE"), such as analog and digital modems, terminal adapters and routers, for example, are used to transfer or transport data between data terminal equipment ("DTE") such as personal computers, workstations, mainframe computers, and other terminals, over various communications channels such as telephone lines, T1 or ISDN lines, which also may be part of a computer network. Typically, the data is transmitted, received, or otherwise transferred in the form of a digitally encoded communication signal, which may include, for example, digitally encoded data transmitted on a carrier signal, having a predetermined or otherwise specified center frequency, that is modulated by a predetermined constellation (or transmit constellation) of signal points (such as quadrature amplitude modulation), at a particular (and usually predetermined) signaling rate. In current and proposed systems, the signaling constellation may include from five hundred to over 1600 signaling points.

At the sending or transmitting DCE, a carrier signal is thus modulated with the set of constellation signal points corresponding to the digital code or value to be transported over the channel. The channel, however, typically introduces or allows a variety of impairments or noise which affect the transmitted signal, such as amplitude distortion, envelope delay distortion, non-linear distortion, additive noise, white noise, and other distortions. At the receiving DCE, the modulated carrier signal may include non-linear distortion, such as harmonic distortion, introduced by the channel along with added distortion due to the echo of the receiving DCE's transmitter.

The effects of nonlinear channel distortion and echo on high speed data transmission and reception of using modems are generally known. Nonlinear channel distortion introduces nonlinear interference in the receiving modem. Echo, such as near-end, far end, and listener echo, also introduces interference in the receiving modem. These distortions increase the probability for decoding errors in the receiving modem or other DCD. Furthermore, as the data rate increases the probability for error due to these distortions is increased and can result in unacceptably high bit error rates.

Prior art solutions to this problem of nonlinear and echo distortions essentially have been to predetermine a power transmit level for a particular type of channel, in an effort to reduce harmonic distortion and echo. Such prior art solutions, however, are neither adaptive nor able to dynamically respond to changing conditions and possible opportunities to adjust and improve the transmit power to further reduce these distortions. Accordingly, a need has remained to provide a method and apparatus for data communications devices and equipment to determine an optimal transmit power level to reduce both nonlinear distortion and echo distortion, in order to optimize the rate of data transmission and reduce error rates.

DETAILED DESCRIPTION OF THE INVENTION

The present invention provides a solution to these problems of nonlinear and echo distortion by providing the method and apparatus embodiments, such as modems, with the capability to determine or identify an improved transmit power level to minimize the effects of nonlinear distortion and distortion due to echo. When the data signal is transmitted at this improved power level, less nonlinear distortion will be introduced into the data signal. In addition, at such an improved power level, the echo power reflected into the transmitting device's receiver will be smaller and will have less nonlinearities, allowing echo cancellation processes to be more effective. As a result, the signal received by a data communications device will have less distortion, may operate at a higher bit rate, and may perform decoding of the signal points from the received signal with a smaller probability of error.

Figure 1:
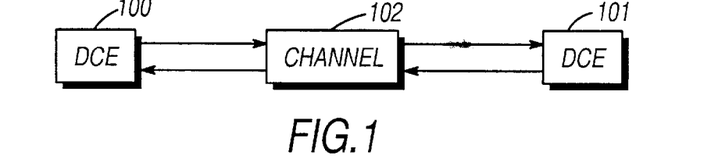
FIG. 1 is a block diagram illustrating modems connected to each other via a channel, for full duplex data transmission and reception.

FIG. 1 illustrates a first DCD 100, such as a first modem, connected to a second DCD 101, such as a second modem, via a channel 102. The modems typically operate in full-duplex, such that each may transmit data and receive data at the same time. In order to compensate for various distortions and impairments which usually exist or occur in the channel during data transmission, various protocols and standards have evolved, such as the International Telecommunication Union (ITU) Recommendation V.34, involving the use of a probe signal having predetermined, defined characteristics, transmitted from the sending DCD to the receiving DCD, during the initial communication period (training period) in which the two devices train with each other. For example, under the V.34 protocol or standard, the probe signal involves the simultaneous transmission of a sequence of twenty-one tones (frequencies) from 150 Hz to 3750 Hz, each tone of equal amplitude and having defined or known phase relationships, with each tone generally separated from other tones at intervals of 150 Hz or integer multiples of 150 Hz, and with some potential tones omitted, such as the 900 Hz, 1200 Hz, 1800 Hz, and 2400 Hz tones. The probe signal is transmitted at two power levels for certain amounts of time, a first high power level known as the L1 probe signal (or the L1 portion of the probe signal), which is set at 6 dB higher power than the nominal level, followed by a second nominal power level known as the L2 probe signal (or the L2 portion of the probe signal). In the United States, a nominal power level is typically −9 dB or −10 dB, and in Europe it is typically 0 dB. The receiving DCD may analyze the received probe signal in light of the standard sequence assumed (or known) to have been transmitted, in order to determine such transmission parameters as the optimum symbol rate, the optimum carrier frequency, the carrier frequency offset, the timing frequency offset, the degree of non-linearity of the channel, and the transmit power level.

Various references concerning the use and analysis of probing signals include the ITU-T Recommendation V.34; Eyuboglu et al. U.S. Pat. No. 5,048,054, issued Sep. 10, 1991, entitled "Line Probing Modem"; Ling et al. U.S. Pat. No. 4,987,569, issued Jan. 22, 1991, entitled "Fast Training Echo Canceller"; and Sridhar et al. U.S. Pat. No. 5,214,637, issued May 25, 1993, entitled "High Speed Two Wire Modem".

In accordance with the present invention, the entire probe signal, both L1 and L2 portions, is processed by the local (receiving) DCD during the training period to determine certain parameters or factors of the received probe signal, compared to the defined probe signal assumed (or known) to have been transmitted by the remote (transmitting) DCD. These parameters or factors include the level of harmonics, the receive power level, the proportional noise level, and the signal to distortion ratio threshold. Based upon an empirically determined weighting of these various parameters or factors, the various embodiments of the present invention determine an improved transmit power level for the remote (transmitting) DCD, and stores that information in a register to be subsequently transmitted to the remote DCD.

Also in accordance with the present invention, a power decrease aspect of the V.34 protocol may be implemented. Under the V.34 protocol, the local modem may transmit this desired power level information to the remote modem, to allow the remote modem to decrease its transmit power by up to 14 dB. The preferred embodiment of the present invention implements such a decrease of up to 7 dB, and may be easily expanded to implement decreases of up to 14 dB. The invention, moreover, may also be implemented to determine any desired increase in transmission power, and should not be considered limited to power decreases.

Figure 2:
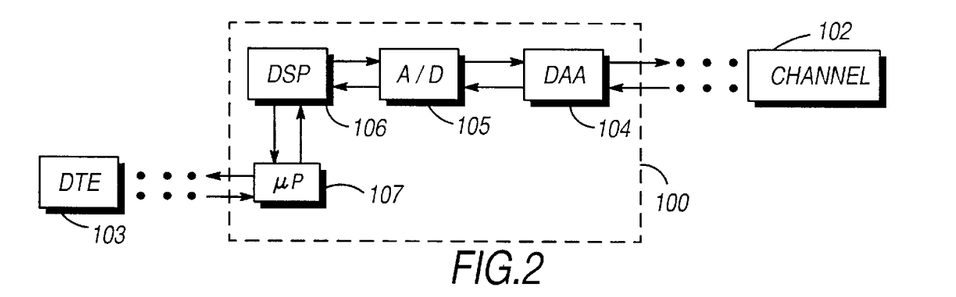
FIG. 2 is a block diagram illustrating a first embodiment of a modem or other DCE in accordance with the present invention.

FIG. 2 is a block diagram illustrating a first embodiment of a modem or other DCD in accordance with the present invention. As shown in FIG. 2, a modem 100 is coupled or connected to a DTE 103, such as a computer, and coupled to a channel 102, for data transmission and reception. Within the modem 100, a data access arrangement 104 known as a "DAA" receives an analog signal transmitted on the channel 102. DAAs are known in the prior art and may be made of a variety of discrete components, including analog multiplexers, resistors, capacitors, and operational amplifiers, or may be embodied in whole or part as an integrated circuit, and performs such functions as impedance matching and power level adjustment. Typically connected to the DAA 104 is an analog-to-digital and digital-to-analog converter 105, referred to herein as an analog-digital ("A/D") converter (or equivalently a coder-decoder known as a "codec"), such as an SGS Thompson ST 7544 or ST 7545, which converts an analog signal received from the channel 102 to sampled, digital form, and converts sampled, digital information to analog form for transmission over the channel 102. The A/D converter 105 is then connected to a digital signal processor ("DSP") 106, such as a Motorola M56002.

The DSP 106 is used in a first embodiment of the invention herein, performing the various functions described in detail below. The DSP 106 is connected to a microprocessor 107, such as a Motorola M68302, which may be coupled to a DTE 103 to transmit and receive digital information.

Figure 3:
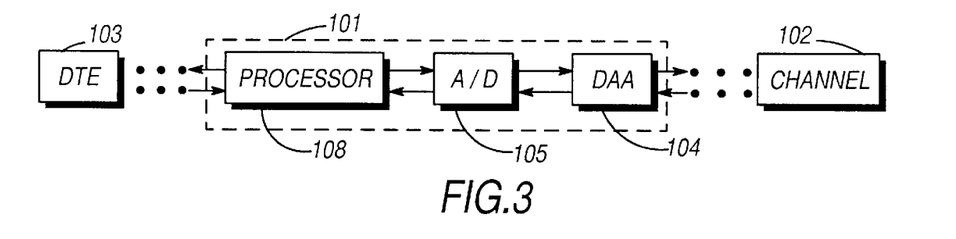
FIG. 3 is a block diagram illustrating a second embodiment of a modem or other DCE in accordance with the present invention.

FIG. 3 is a block diagram illustrating a second embodiment of a modem or other DCD in accordance with the present invention.

Referring to FIG. 3, the DAA 104 and A/D converter (or codec) 105 perform the same functions, may be the identical components, and are similarly connected as previously discussed with reference to FIG. 2. In contrast with the modem 100 of FIG. 2, however, FIG. 3 illustrates a modem or other DCE 101 containing a processor 108, such as a Motorola M68356, which performs the functions of both the DSP 106 and the microprocessor 107 of FIG. 2. The processor 108 is used in a second embodiment of the invention herein, also performing the various functions described in detail below. The processor 108 may also be coupled to a DTE 103 to transmit and receive digital information. As a consequence of the interchangeability of a DSP with a processor in these various embodiments, the terms DSP and processor (or microprocessor) are used interchangeably and inclusively herein, such that use of one term may be interpreted to mean and include the various other processor embodiments.

For ease of reference, following is a list of symbols and abbreviations used herein and their associated meanings:

| | |
|---|---|
| x(n) | The complex analytic output of the initial processor consisting of the probe signal received from the channel. This received probe signal is a set of tones at frequency multiples of 1/T. |
| $f_i$ | The frequency of the $i^{th}$ tone. |
| | The amplitude of x(n) at frequency $f_i$. |
| L1 | The probe signal transmitted at 6dB above nominal tranmit power. |
| L2 | The probe signal transmitted at nominal transmit power. |
| $G_u$ | The gains associated with L1 and L2 |
| T | The period of the probe signal and the reciprocal of the frequency spacing between tones. |
| j | The square root of −1, as commonly used in physics and engineering. |
| P | The number of samples of x(n) in one period of the received probe signal. |
| L | The number of FFTs in a set. |
| M | The number of periods delay between adjacent FFTs. |
| K | The number of periods consumed by each FFT. |
| w(m) | The window function for the FFTs. |
| $R_{n,l}(k/KT)$ | The output of the $l^{th}$ FFT at time n. |
| $X_n(k/KT)$ | The averaged FFT result. |
| SDR | Signal to distortion ratio at output of a decision feedback equalizer. |
| $S_n(f_i)$ | Discrete signal power spectrum. |
| $N_n(f_i)$ | Discrete noise power spectrum. |
| $PWRDP_{FINAL}$ | Power decrease (drop) requested from remote modem. |
| $PWRDP_{allow}$ | Power decrease based only on receive power level. |
| $PWRDP_{HARM}$ | Power decrease based only on harmonic level. |
| $PWRDP_{PCM}$ | Power decrease based only on level of proportional noise. |
| $PWRDP_{SDR}$ | Power decrease based only on SDR level. |
| $HARM_{L1}$ | Power level of harmonics during L1 |
| $HARM_{L2}$ | Power level of harmonics during L2 |
| $SDR_{L1}$ | SDR during L1 |
| $SDR_{L2}$ | SDR during L2 |

Figure 4:
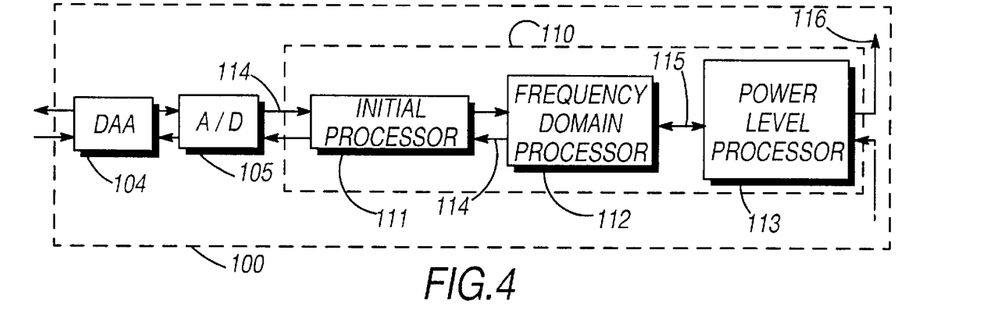
FIG. 4 is a block diagram illustrating the functional components of an embodiment of the present invention.

FIG. 4 is a block diagram which illustrates the functional components of an embodiment of the present invention. Referring to FIG. 4, as mentioned above, the invention herein may be embodied using a DSP (or as a processor) 110. Accordingly, as used herein, "processor" shall refer to and include a digital signal processor, a microprocessor, or any other integrated circuit which may combine the functions of a DSP and microprocessor. As discussed in more detail below, the DSP or processor 110 has three major programmable functional blocks or components, an initial processor 111, a frequency domain processor 112, and a power level processor 113.

Referring to FIG. 4, a remote modem or other remote DCD typically transmits a probe signal, via a channel 102 (such as the public switched telephone network ("PSTN")), generated using a probe generator. The channel 102 usually distorts the probe signal and adds noise. The A/D converter 105 samples the received channel output (the probe signal), and the initial processor 111 of the local modem or other local DCE 120 converts the received signal into a complex analytic signal. The frequency domain processor 112 converts the complex analytic signal from the time domain into the frequency domain, and produces an estimate of the signal spectrum, the signal to distortion ratio (SDR) of the channel, and the harmonic power, and transmits this information to the power level processor 113 via bus 115. The power level processor 113 uses these parameters or factors of the signal spectrum, the harmonic power, and the SDR information to determine an improved or optimal power level (or amount of power decrease under the V.34 protocol) in the transmitter of the remote modem, if any, which would provide improved performance in the receiver of the local modem, for example, by reducing harmonic distortion, and in the receiver of the remote modem, for example, by reducing echo distortion. These blocks, parameters and signals are described in greater detail below.

Continuing to refer to FIG. 4, both the local modem 100 and the remote modem transmit a probe signal to the other, during the initial training period. The probe signal having a period T (for the 150 Hz tone) consists of a sequence of equal amplitude tones at frequency multiples (or intervals) of 1/T. Also as mentioned above, certain multiples of 1/T frequencies have zero amplitude (i,e. are omitted) and, accordingly, the level of harmonic distortion may be measured at those frequencies. The probe signal also has two portions or segments, L1 and L2, with the transmit power level of L1 6 dB higher than the nominal power level of L2. Ideally,the probe signal may be represented as:

$$G_u Re \left\{ \sum_i e^{j(2\pi f_i t + \beta_i)} \right\}$$

where $f_i$ is the frequency of the $i^{th}$ tone of the probe signal (and "i" is incremented in integer multiples of 1/T), j is the square root of −1, $\beta_i$ is the phase angle associated with the $i^{th}$ tone, $G_u$ is the gain associated with the probe signal, such that $G_1$ is the specific gain associated with L1 and $G_2$ is the specific gain associated with L2, and Re is the real operator.

As mentioned above, the channel 102 typically distorts the probe signal in several ways. For example, it can introduce amplitude distortion, envelope delay, non-linear distortion, carrier and timing frequency offset, ADPCM, tandem PCM, and additive noise. The received probe signal (received by the local modem 100 from the channel 102) may then be represented as:

$$Re \left\{ G_u \sum_i A_i e^{j(2\pi f_i t + \gamma_i)} \right\} + N_2(t)$$

where $A_i$ is the amplitude of of the $i^{th}$ tone of the received probe signal, $\gamma_i$ is phase angle associated with the $i^{th}$ tone, and $N_2(t)$ is the channelinduced distortion.

Figure 5:
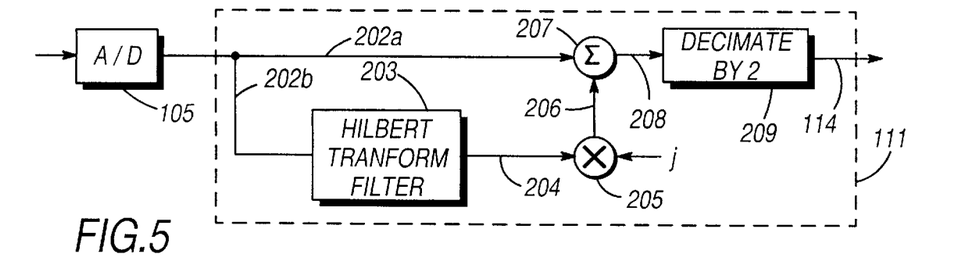
FIG. 5 is a block diagram illustrating the initial processor component of a processor in accordance with the present invention.

FIG. 5 is a block diagram illustrating the initial processor component 111 of a processor used in accordance with the present invention. Referring to FIG. 5, the initial processor 111 includes an A/D (analog-digital) converter (or codec) 201 which samples the received probe signal at a rate 2P/T, where P is the number of samples in one period of the received probe signal. The initial processor produces a sampled, received probe signal transmitted on line 202b to a Hilbert transform filter 203, which may have the following ideal transfer function:

$$H(e^{j2\pi f}) = \begin{cases} -j, & f > 0 \\ j, & f < 0 \end{cases}$$

where j is the square root of −1. The output signal on line 204 from the Hilbert transform filter 203 is multiplied by j in multiplier 205. The combined transfer function of the Hilbert transform filter 203 and the multiplier 205 may be the following (ideal) transfer function:

$$jH(e^{j2\pi f}) = \begin{cases} 1, & f > 0 \\ -1, & f < 0 \end{cases}$$

producing an output signal on line 206. The sum of the sampled probe signal (on line 202a) and the output signal from the combined Hilbert transform filter and multiplier (on line 206), using the summer 207, yields a complex analytic signal on line 208. This complex analytic signal is zero for negative frequencies. Because the negative frequency components have been eliminated, the sample rate may be reduced (decimated) in block 209 by a factor of 2 without aliasing, resulting in an output on line 114 from the initial processor 111 with a sample rate P/T which may be represented as:

$$x(n) = G_u \sum_i A_i e^{j\left[2\pi f_i \left(\frac{nT}{P}\right) + \lambda_i\right]} + N_1(n)$$

where n is the sequence number in a sequence of samples (discrete time index), $\lambda_i$ is a phase angle, and $N_1(n)$ is the complex analytic channelinduced distortion.

Figure 6:
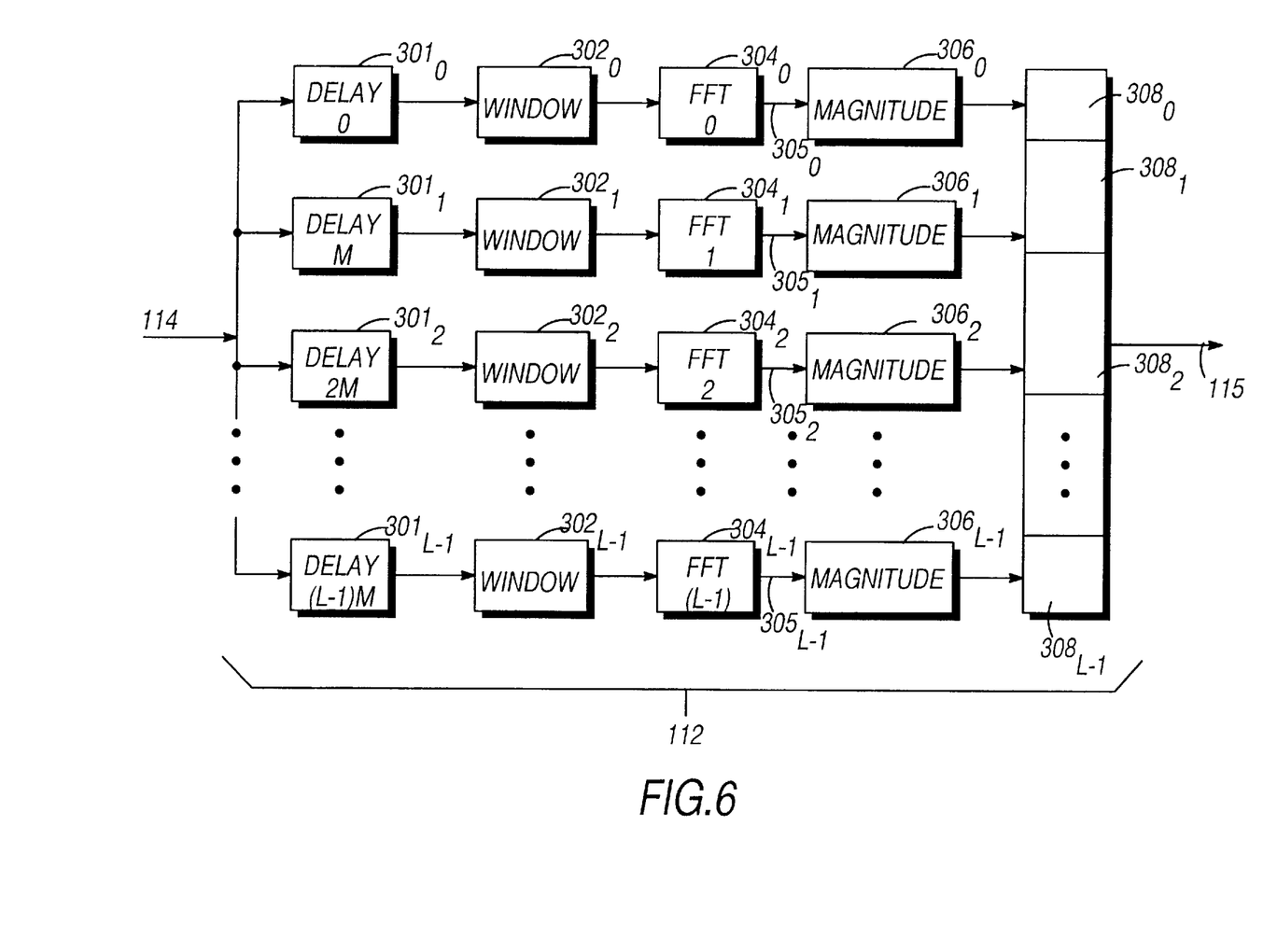
FIG. 6 is a block diagram illustrating the frequency domain processor component of a processor in accordance with the present invention.

FIG. 6 is a block diagram illustrating the frequency domain processor component 112 of a DSP or processor used in accordance with the present invention. In the preferred embodiment, the frequency domain processor component 112 contains a Fourier transform block 304, to produce a set of L identical Fast Fourier Transforms ("FFTs"), indexed from 0 to L−1, the outputs of which are averaged in block 308 to increase the signal to noise ratio (SNR) at each tone frequency $f_i$ of the probe signal. X(n) is delayed in delay block 301 by LMP samples, where L,M, and P are integers, L is the number of FFTs in a set, M is the number of periods of delay between adjacent FFTs, and as indicated above, P is the number of samples in one period of the received probe signal. In a preferred embodiment, L has two values, with L=8 for the L1 portion of the probe and L=32 for the L2 portion of the probe, M is 2, and P is 32.

Referring to FIG. 6, the sampled, received probe signal from the initial processor 111 is applied to L delay units 301$_0$ through 301$_{L-1}$. The delay applied by each unit is fixed, and ranges from 0 to (L−1)M periods, corresponding to the FFT index 0 to L−1, where M is an integer. The output of each delay unit (a total of L units) is applied to a KP-point window function, blocks 302$_0$ through 302$_{L-1}$ (also a corresponding total of L window function blocks). In the preferred embodiment, a set of L Blackman-Harris windows are used to reduce sidelobe amplitude by more than 60 dB midway between the tone frequencies, for hoise measurement. A set of L Fast Fourier Transforms is performed in blocks $304_0$ through $304_{L-1}$, in which each FFT consumes K probe periods of data. In the preferred embodiment, K=8. The output of each FFT appearing on lines $305_0$ through $305_{L-1}$ may be represented as:

$$R_{n,l}\left(\frac{k}{KT}\right) = \frac{1}{KP} \sum_{m=0}^{KP-1} x(n - lMP - KP + 1 + m)w(m)e^{\frac{-j2\pi mk}{KP}}$$

where w(m) is the window function, k is the frequency index, and I is the FFT index.

Continuing to refer to FIG. 6, magnitudes of the FFT outputs are determined in blocks $306_0$ through $306_{L-1}$, and are averaged in blocks $308_0$ through $308_{L-1}$ to increase the signal to noise ratio at each tone frequency $f_i$. In the preferred embodiment, each FFT utilizes 256 samples of the incoming signal, and L (8 or 32) FFTs for each tone frequency are averaged in blocks $406_0$ through $406_{L-1}$, to create an L-fold redundancy which may tend to reduce any components attributable to random noise and increase the accuracy of the determination of the signal to noise ratios. The averaged magnitudes of these Fourier transform blocks (sampled at a time index n such that all FFTs have been completed) appears on line or bus 115, for input into the power level processor 113, and may be represented as:

$$X_n\left(\frac{k}{KT}\right) = \frac{1}{L} \sum_{l=0}^{L-1} \left| R_{n,l}\left(\frac{k}{KT}\right) \right|$$

Figure 7:
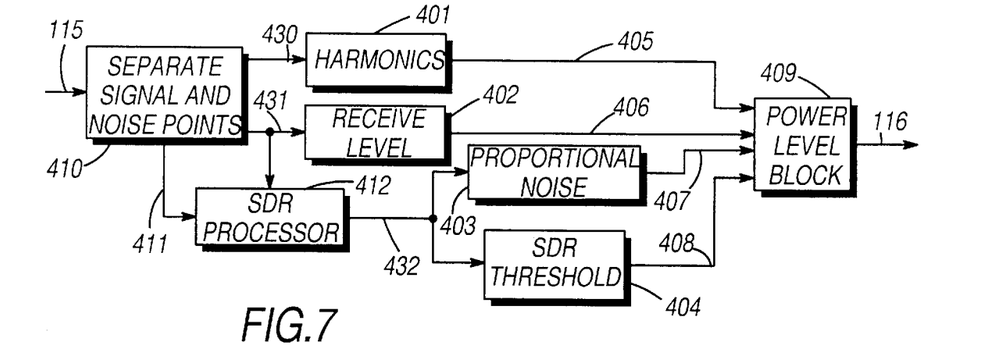
FIG. 7 is a block diagram illustrating the power level processor component of a processor in accordance with the present invention.

FIG. 7 is a block diagram illustrating the power level processor 113 of the preferred embodiment of the present invention. In block 410, the averaged magnitudes of the FFTs corresponding to signal points (from the received probe signal) are separated from the averaged magnitudes of the FFTs corresponding to noise points. The signal amplitudes (averaged magnitudes) are $S_n(f_i)=X_n(f_i)$ for each frequency $f_i$, and are output on line 431. In the preferred embodiment, the noise amplitudes (averaged magnitudes) are chosen to correspond to a given tone frequency of the received probe signal, and are $N_n(f_i)=[X_n(f_i-3/2T)+X_n(f_i-1/2T)+X_n(f_i+1/2T)]/3$ for each frequency $f_i$, which are then input to the signal to distortion ("SDR") processor 412. In other words, the signal amplitudes are determined by measuring the amplitude of the frequency domain signal at the various probe tone frequencies; each noise amplitude corresponding to or associated with a given probe tone frequency is determined by averaging the amplitudes of the frequency domain signal at two or three neighboring frequencies, which frequencies are each midway between several adjacent probe tone frequencies (on either side of the given probe tone frequency). For example, for the probe tone at 1500 Hz, the amplitude of the corresponding noise frequency may be measured as an average of the noise magnitudes at 1425 Hz and 1575 Hz, or at 1275 Hz, 1425 Hz and 1575 Hz, and so on. The averaged magnitudes of the harmonic levels are output from block 410 on line 430. Harmonics appearing in the received probe signal may be measured at frequencies such as 900 Hz, 1200 Hz, 1800 Hz and 2400 Hz. In the preferred embodiment, probe signal harmonics are measured at 900 Hz.

Continuing to refer to FIG. 7, the SDR (signal to distortion ratio) processor 412 utilizes the signal amplitudes (on line 431) and the noise amplitudes (on line 411), and predicts a signal to distortion ratio at the output of a decision feedback equalizer (DFE) for each combination of carrier frequency and symbol (baud) rate under consideration, such as a symbol (baud) rate of 3200 with a carrier frequency of 1829 Hz or with a carrier frequency of 1920 Hz (Table 2, Recommendation V.34). The SDR value is calculated for both the high power probe portion (L1) and the low power probe portion (L2). The SDR at the output of a DFE may be determined if the power spectrum of the signal and noise at the input to the DFE is known. The SDR is determined as follows:

$$\frac{1}{SDR} = e^{\left\{ \frac{1}{f_{sym}} \int_{f_c - \frac{f_{sym}}{2}}^{f_c + \frac{f_{sym}}{2}} ln\left[ \frac{N(f)}{S(f)+N(f)} \right] df \right\}}$$

where S(f) and N(f) are the power spectral density of the signal and noise, respectively, and $f_{sym}$ is the symbol rate and $f_c$ is the carrier frequency for the particular symbol rate and carrier frequency combination under consideration, from among the plurality of combinations of symbol rates and carrier frequencies available in the various protocols.

For the discrete frequency case, this equation may be approximated as follows:

$$\frac{1}{SDR} = \left[ \prod_i \frac{N(f_i)}{S(f_i)\frac{TB_nB_p}{f_{sym}} + N(f_i)} \right]^{\frac{1}{NumTones}}$$

where the summation is over the values of "i" such that $$f_c - \frac{f_{sym}}{2} \leq f_i \leq f_c + \frac{f_{sym}}{2}$$

and NumTones is the number of tones included in the summation. The term "$TB_n$" is a correction factor for the noise power spectrum, correcting for the noise bandwidth of the window (block 302, FIG. 6), $B_n$, preceding the FFT, making the measured noise power the same as it would be if it were measured in the bandwidth 1/T. In addition, the term "$B_p/f_{sym}$" is a correction factor for the probe signal power spectrum. The probe signal is a wideband signal, with bandwidth, $B_p$, exceeding the bandwidth of the actual modem signal, $f_{sym}$. This term makes the power spectral density of the probe signal the same as it would be if it occupied only the modem bandwidth, $f_{sym}$. In the preferred embodiment, $TB_n$ is 0.25 and $B_p$ is 3750 Hz.

Since the SDR is needed in dB, and to eliminate problems caused by fixed point multiplication implementation, the SDR equation for the discrete frequency case is further approximated by the logarithm $$\log(SDR) = \frac{1}{Num\text{Tones}} \sum_i \log\left( S(f_i) \frac{TB_n B_p}{f_{sym}} + N(f_i) \right) - \log(N(f_i))$$

The logarithms are approximated using known techniques, such as combining simple shifts and a lookup table. In the preferred embodiment, eleven signal to distortion ratios (one for each baud rate and carrier frequency combination) are determined at each L1 and L2 power level, for a total of 22 SDRs output on line 432 to the proportional noise detector 403 and the SDR threshold detector 404.

Continuing to refer to FIG. 7, the harmonic magnitude (or, equivalently, power) level measured at 900 Hz, $X_n(900Hz)$, (on line 430) is input into the harmonics detector 401 and analyzed to determine the amount of harmonics present. The frequency 900Hz is one of the multiples of 1/T where no tone is present in the probe signal, such that measuring the power at 900 Hz provides an indication of the amount of harmonic distortion present in the received probe signal. The $X_n(900Hz)$ which is produced from probe segment L1 is referred to as "$HARM_{L1}$".

The $X_n(900Hz)$ which is produced from probe segment L2 is referred to as "$HARM_{L2}$". The harmonics detector 401 compares $HARM_{L1}$ with $HARM_{L2}$, and the ratio of these power levels determines the harmonics factor or parameter ($PWRDP_{HARM}$), namely, the power level (or, under V.34, the amount of power decrease) which may be preferable due to harmonics (PWRDPHARM). In V.34 protocol embodiments, the ranges of preferred power decrease levels due to harmonics empirically were found to be:

| | | | |
|---|---|---|---|
| $PWRDP_{HARM}$ | = | 0 dB | if $HARM_{L1}/HARM_{L2} < 9$ dB. |
| $PWRDP_{HARM}$ | = | 1 dB | if 9 dB $< HARM_{L1}/HARM_{L2} < 12$ dB. |
| $PWRDP_{HARM}$ | = | 3 dB | if 12 dB $< HARM_{L1}/HARM_{L2} < 15$ dB. |
| $PWRDP_{HARM}$ | = | 5 dB | if 15 dB $< HARM_{L1}/HARM_{L2} < 18$ dB. |
| $PWRDP_{HARM}$ | = | 7 dB | if $HARM_{L1}/HARM_{L2} > 18$ dB. |

Also referring to FIG. 7, the receive level detector 402 sums the squares of the power level of the individual received probe tone frequencies from the nominal power level (L2):

$$\sum_i X_n^2(f_i)$$

to provide a representation of the received power level, accounting for any deviations which may have been caused by the channel. In the preferred embodiment (utilizing the V.34 protocol), the receive level detector 402 then determines an allowable power decrease factor or parameter "$PWRDP_{allow}$" based upon this received power level factor or parameter and also upon an empirically determined "noise" threshold. The noise threshold in the preferred embodiment was found to be −32 dBm to maintain appropriate signal to noise ratios for high bit rates. The allowable power decrease factors $PWRDP_{allow}$ were determined to have the following preferred levels or ranges:

| | | |
|---|---|---|
| $PWRDP_{allow}$ | = | 0 dB if receive level < −32 dBm |
| $PWRDP_{allow}$ | = | 1 dB if −31 dBm > receive level > −32 dBm |
| $PWRDP_{allow}$ | = | 2 dB if −30 dBm > receive level > −31 dBm |
| $PWRDP_{allow}$ | = | 3 dB if −29 dBm > receive level > −30 dBm |
| $PWRDP_{allow}$ | = | 4 dB if −28 dBm > receive level > −29 dBm |
| $PWRDP_{allow}$ | = | 5 dB if −27 dBm > receive level > −28 dBm |
| $PWRDP_{allow}$ | = | 6 dB if −26 dBm > receive level > −27 dBm |
| $PWRDP_{allow}$ | = | 7 dB if receive level > −26 dBm |

The signal to distortion ratio information from the SDR processor 412 (preferably, 22 SDR values (11 for each probe power level)) is input into the proportional noise detector 403 and the signal to distortion threshold detector 404. The proportional noise detector 403 compares the signal to distortion ratios of the high power probe $SDR_{L1}$ to the signal to distortion ratios of the nominal power probe $SDR_{L2}$. In the preferred embodiment, the ranges of desired power decrease levels due to proportional noise in a pulse code modulation system "$PWRDP_{PCM}$" were empirically determined to be related to the difference of these two parameters as follows:

| | | |
|---|---|---|
| $PWRDP_{PCM}$ | = | 0 dB if $(SDR_{L1} − SDR_{L2}) > 3$ dB. |
| $PWRDP_{PCM}$ | = | 2 dB if 3 dB > $(SDR_{L1} − SDR_{L2}) > 2$ dB. |
| $PWRDP_{PCM}$ | = | 3 dB if 2 dB > $(SDR_{L1} − SDR_{L2}) > 1$ dB. |
| $PWRDP_{PCM}$ | = | 4 dB (or more) if 1 dB > $(SDR_{L1} − SDR_{L2})$. |

Continuing to refer to FIG. 7, the signal to distortion threshold detector 404 compares the signal to distortion ratio of the nominal power probe $SDR_{L2}$ to the known signal to distortion ratio required to operate at a selected bit rate, such as the highest bit rate under V.34. To avoid an inadvertent decrease from a potentially available higher bit rate, a few dB margin of error is included to prevent dropping below a required SDR to run the higher bit rate. The range of power decreases due to a signal to distortion ratio "$PWRDP_{SDR}$", in the preferred embodiment with a preferred minimum SDR of 36 dB, were empirically determined to be:

| | | | |
|---|---|---|---|
| $PWRDP_{SDR}$ | = | 0 dB | if $SDR_{L2} < 36$ dB. |
| $PWRDP_{SDR}$ | = | $SDR_{L2} − 36$ dB | if $SDR_{L2} > 36$ dB. |

These four parameters or factors, $PWRDP_{HARM}$ (on line 405), $PWRDP_{allow}$ (on line 406), $PWRDP_{PCM}$ (on line 407), and $PWRDP_{SDR}$ (on line 408), are inputs into the power level block 409. The power level block 409 may implement any desired weighting scheme or decision methodology to determine a final power level parameter or factor "$PWRDP_{FINAL}$" output on line 116. In the preferred embodiment, the receive power level was given priority, such that if the receive power level were low, power would not be decreased any further. The remaining factors were equally weighted, to provide a maximum power decrease as needed to improve performance, resulting in the following methodology:

$$PWRDP_{FINAL} = \text{MIN}\{PWRDP_{allow}, \text{MAX}(PWRDP_{HARM}, PWRDP_{PCM}, PWRDP_{SDR})\}$$

The $PWRDP_{FINAL}$ parameter is then loaded into a register to be subsequently transmitted to the remote modem, such that if the remote modem were to reduce its transmit power by the value of this parameter, then improved received signal quality should result, along with reduced echo to receiver of the remote modem.

In summary, an embodiment of the invention may include a modem (100 or 101 of FIG. 1) or other data communications device for data transmission and reception. In accord with a variety of protocols, the modem has an initial training period for determining a transmit power level from a transmitted probe signal received via a channel, in which the transmitted probe signal has a sequence of a plurality of tones having predetermined frequency, amplitude and phase characteristics, the transmitted probe signal having a first power level and a second power level, and in which the transmitted probe signal is transmitted for a minimum duration. The modem then comprises: a data access arrangement (104) coupleable to a channel (102) to receive the transmitted probe signal, to form a received probe signal; an analog-digital converter (105) coupled to the data access arrangement (104) to sample and convert the received probe signal to form a plurality of sets of received probe tones; and a processor (108) (or a DSP 106) coupled to the analog-digital converter (105) to receive the plurality of sets of received probe tones. The processor (108) is responsive to determine an average probe signal level for each tone frequency of the plurality of sets of received probe tones for the first power level, to form a first set of probe signal average power levels, and for the second power level, to form a second set of probe signal average power levels, and to determine an average noise level for a plurality of noise frequencies for the first power level, to form a first set of average noise levels and for the second power level, to form a second set of average noise levels. The processor (108) is further responsive to determine a harmonic content parameter of the plurality of sets of received probe tones, for the first power level and for the second power level and to determine a receive signal power parameter from the second set of probe signal average power levels; and to determine a plurality of signal to distortion ratios, each of the plurality of signal to distortion ratios corresponding to a symbol rate and carrier frequency combination from a plurality of combinations of symbol rates and carrier frequencies, to form a set of signal to distortion ratios, and to determine a proportional noise parameter and a signal to distortion threshold parameter from the set of signal to distortion ratios. The processor (108) is then further responsive to determine a transmit power level from the signal to distortion threshold parameter, the harmonic content parameter, the receive signal power parameter, and the proportional noise parameter.

In addition, in the modem embodiment, the processor (108) may be further responsive to determine a power decrease factor from the maximum of the harmonic content parameter, the signal to distortion threshold parameter, and the proportional noise parameter; and determine the transmit power level from the minimum of the receive signal power parameter and the power decrease factor.

In the modem embodiment, moreover, to determine the average signal levels of the probe signal, the analog-digital converter (105) samples a first set of received probe tones having the first power level to form a first set of sampled tones, and samples a second set of received probe tones having the second power level to form a second set of sampled tones; and the processor (108) is further responsive to perform a sequence of Fourier transformations (block 304) of the first set of sampled tones to form a plurality of sets of sequential Fourier transforms corresponding to each probe tone frequency and averaging (308) a plurality of magnitudes of the sequential Fourier transforms corresponding to each frequency to form the first set of probe signal average power levels, and to perform a sequence of Fourier transformations (block 304) of the second set of sampled tones to form a plurality of sets of sequential Fourier transforms corresponding to each probe tone frequency and averaging (308) a plurality of magnitudes of the sequential Fourier transforms corresponding to each frequency to form the second set of second probe signal average power levels.

Similarly to determine the average noise levels, in the modem embodiment the analog-digital converter (105) samples a first set of noise received together with the received probe signal having the first power level to form a first set of sampled noise, and samples a second set of noise received together with the received probe signal having the second power level to form a second set of sampled noise; and the processor (108) is further responsive to perform a sequence of Fourier transformations (304) of the first set of sampled noise to form a plurality of sets of sequential Fourier transforms for each corresponding noise frequency and averaging (308) a plurality of magnitudes of the sequential Fourier transforms for each corresponding noise frequency to form the first set of average noise levels, and to perform a sequence of Fourier transformations (304) of the second set of sampled noise to form a plurality of sets of sequential Fourier transforms for each corresponding noise frequency and averaging (308) a plurality of magnitudes of the sequential Fourier transforms for each corresponding noise frequency to form the second set of average noise levels.

Other features of the modem embodiment include the processor being further responsive to determine a set of a plurality of corresponding noise frequencies (410), each of the plurality of corresponding noise frequencies having a predetermined frequency difference from a probe tone frequency of the plurality of tones of the received probe signal; and to determine each of the first and second sets of average noise levels from an average of a plurality of samples of noise levels from the set of the plurality of corresponding noise frequencies. For example, the frequency difference may be midway between adjacent probe tone frequencies, or approximately 75 Hz. In other variations, the frequency difference may have any selected value, such that noise values may be determined at any frequency between the various probe frequencies.

The processor (108) of the modem embodiment may also be further responsive to determine the plurality of signal to distortion ratios (412) from:

$$\frac{1}{SDR} = e\left\{\frac{1}{f_{sym}} \int_{f_c - \frac{f_{sym}}{2}}^{f_c + \frac{f_{sym}}{2}} ln\left[\frac{N(f)}{S(f) + N(f)}\right] df\right\}$$

in which S(f) is a power spectral density of the received probe signal, N(f) is a power spectral density of the set of corresponding noise frequencies, and in which $f_{sym}$ is a symbol rate and $f_c$ is a carrier frequency corresponding to a symbol rate and carrier frequency combination from the plurality of combinations of symbol rates and carrier frequencies. Using a less complicated implementation, the processor may instead determine the plurality of signal to distortion ratios (412) from:

$$\log(SDR) = \frac{1}{Num\text{Tones}} \sum_i \log\left(S(f_i) \frac{TB_n B_p}{f_{sym}} + N(f_i)\right) - \log(N(f_i))$$

in which S(f) is a power spectral density of the received probe signal, N(f) is a power spectral density of the set of corresponding noise frequencies, $f_{sym}$ is a symbol rate and $f_c$ is a carrier frequency corresponding to a symbol rate and carrier frequency combination from the plurality of combinations of symbol rates and carrier frequencies, $f_i$ is the frequency of the $i^{th}$ tone of the probe signal, $\Sigma$ is a summation over values "i" such that $$f_c - \frac{f_{sym}}{2} \leq f_i \leq f_c + \frac{f_{sym}}{2}$$

NumTones is a number of tones of the probe signal plus a number of corresponding noise frequencies included in the summation, "$TB_n$" is a correction factor for the noise power spectrum, $B_n$ is a noise bandwidth parameter, and "$B_p/f_{sym}$" is a correction factor for the probe signal power spectrum.

The modem embodiment may also include a harmonics detector block 401 such that the processor is further responsive to determine a magnitude of an amplitude of a harmonic tone frequency of the received probe signal, the harmonic tone frequency being an integer multiple of a probe tone frequency of the transmitted probe signal and further being a tone frequency omitted from the transmitted probe signal, for the first power level of the received probe signal, to form a first magnitude; to determine a magnitude of an amplitude of the harmonic tone frequency of the received probe signal, for the second power level of the received probe signal, to form a second magnitude; and to form a ratio of the first magnitude to the second magnitude to form the harmonic content parameter. The processor is also further responsive (receive level detector block 402) to determine the receive signal power parameter from a sum of the squares of each of the average probe signal levels of the second set of probe signal average power levels and from a noise threshold level.

Other features of the modem embodiment may include the processor being further responsive to determine a first set of signal to distortion ratios corresponding to the first power level of the received probe signal, and to determining a second set of signal to distortion ratios corresponding to the second power level of the received probe signal; to select a signal to distortion ratio from the first set of signal to distortion ratios corresponding to a symbol rate and carrier frequency combination to form a first SDR, and to select a signal to distortion ratio from the second set of signal to distortion ratios corresponding to the symbol rate and carrier frequency combination to form a second SDR; and to form a ratio of the first SDR to the second SDR to determine the proportional noise parameter (proportional noise detector block 403).

Figure 8:
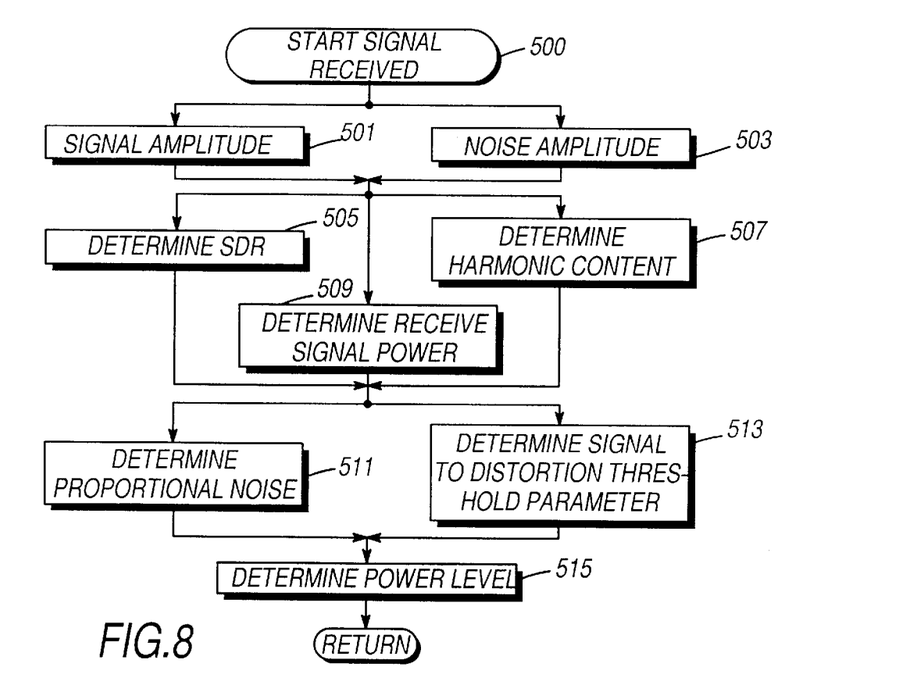
FIG. 8 is a flow diagram illustrating the method embodiment of the present invention.

FIG. 8 is a flow diagram illustrating the preferred method embodiment of the present invention. As mentioned above, the method embodiment may be programmed into a DSP or processor to form an apparatus embodiment of the invention. As in the various apparatus embodiments, the method for determining a power level for data transmission and reception also utilizes a transmitted probe signal received via a channel, the transmitted probe signal having a sequence of a plurality of tones having predetermined frequency, amplitude and phase characteristics, the transmitted probe signal having a first power level and a second power level, with the transmitted probe signal received for a minimum duration for each of the first and second power levels to form a received probe signal having a plurality of sets of received probe tones. Referring to FIG. 8, the method begins when the probe signal has been or is being received, step 500. Next, in step 501, an average probe signal level is determined for each tone frequency of the received probe tone, for the first power level and for the second power level, to respectively form a first set of probe signal average power levels and a second set of probe signal average power levels. As discussed above, this determination may further involve: (1) sampling a first set of received probe tones having the first power level to form a first set of sampled tones; (2) sampling a second set of received probe tones having the second power level to form a second set of sampled tones; (3) performing a sequence of Fourier transformations of the first set of sampled tones to form a plurality of sets of sequential Fourier transforms corresponding to each probe tone frequency and averaging a plurality of magnitudes of the sequential Fourier transforms corresponding to each frequency to form the first set of probe signal average power levels; and (4) performing a sequence of Fourier transformations of the second set of sampled tones to form a plurality of sets of sequential Fourier transforms corresponding to each probe tone frequency and averaging a plurality of magnitudes of the sequential Fourier transforms corresponding to each frequency to form the second set of second probe signal average power levels. It will be appreciated that this step 501 is analogous to the processing provided by the initial processor 111 and the frequency domain processor 112 of FIGS. 4–6.

Next, in step 503, which may occur simultaneously with step 501, an average noise level is determined for a plurality of noise frequencies, for the first power level and for the second power level, to respectively form a first set of average noise levels and a second set of average noise levels. This step 503 may have various sub-steps, such as determining a set of a plurality of corresponding noise frequencies, each of the plurality of corresponding noise frequencies having a predetermined frequency difference from a tone frequency of the plurality of tone frequencies of the probe signal; and determining each of the first and second sets of average noise levels from an average of a plurality of samples of noise levels from each of the plurality of corresponding noise frequencies. As in the determination of the average probe signal levels, the determination of average noise levels may also include: (1) sampling a first set of noise received together with the received probe signal having the first power level to form a first set of sampled noise; (2) sampling a second set of noise received together with the received probe signal having the second power level to form a second set of sampled noise; (3) performing a sequence of Fourier transformations of the first set of sampled noise to form a plurality of sets of sequential Fourier transforms for each corresponding noise frequency and averaging a plurality of magnitudes of the sequential Fourier transforms for each corresponding noise frequency to form the first set of average noise levels; and (4) performing a sequence of Fourier transformations of the second set of sampled noise to form a plurality of sets of sequential Fourier transforms for each corresponding noise frequency and averaging a plurality of magnitudes of the sequential Fourier transforms for each corresponding noise frequency to form the second set of average noise levels.

Continuing to refer to FIG. 8, steps 505, 507, and 509 may occur in any order or may occur simultaneously. In step 505, a plurality of signal to distortion ratios are determined, each of the plurality of signal to distortion ratios corresponding to a symbol rate and carrier frequency combination from a plurality of combinations of symbol rates and carrier frequencies, to form a set of signal to distortion ratios. This step 505 may also include, as sub-steps, the processing steps and solutions to the various equations discussed above with respect to the SDR processor 412 of FIG. 7.

In step 507, a harmonic content parameter of the received probe signal is determined, for the first power level and for the second power level. This step may also include: (1) determining a magnitude of an amplitude of a harmonic tone frequency of the received probe signal, the harmonic tone frequency being an integer multiple of a probe tone frequency and further being a tone frequency omitted from the transmitted probe signal, for the first power level of the received probe signal, to form a first magnitude; (2) determining a magnitude of an amplitude of the harmonic tone frequency of the received probe signal, for the second power level of the received probe signal, to form a second magnitude; and (3) forming a ratio of the first magnitude to the second magnitude. For example, a tone frequency omitted from the transmitted probe signal may be 900 Hz, 1200 Hz, 1800 Hz, or 2400 Hz.

In step 509, a receive signal power parameter is determined from the second set of probe signal power levels. Determining the receive signal power parameter may also include summing of the squares of the average probe signal levels of the second set of probe signal average power levels and determining a noise threshold level.

In step 511, a proportional noise parameter is determined from the set of signal to distortion ratios. Determining the proportional noise parameter may also include: (1) determining a first set of signal to distortion ratios corresponding to the first power level of the received probe signal; (2) determining a second set of signal to distortion ratios corresponding to the second power level of the received probe signal; (3) selecting a signal to distortion ratio from the first set of signal to distortion ratios corresponding to a symbol rate and carrier frequency combination to form a first SDR; (4) selecting a signal to distortion ratio from the second set of signal to distortion ratios corresponding to the symbol rate and carrier frequency combination to form a second SDR; and (5) forming a ratio of the first SDR to the second SDR.

Step 513 may occur before, after, or simultaneously with step 511. In step 513, a signal to distortion threshold parameter is determined, from the set of signal to distortion ratios. More specifically, the signal to distortion threshold determining step compares the signal to distortion ratio of the nominal power probe $SDRL_2$ to a known signal to distortion ratio required to provide the highest: bit rate or another selected bit rat.

Lastly, in step 515, a transmit power level is determined from the signal to distortion threshold parameter, the harmonic content parameter, the receive signal power parameter, and the proportional noise parameter. In the preferred embodiment, the transmit power level is determined by first determining a power decrease factor from the maximum of the harmonic content parameter, the signal to distortion threshold parameter, and the proportional noise parameter; and then determining the transmit power level from the minimum of the receive signal power parameter and the power decrease factor. The transmit power level is then stored for transmission to the remote modem, such that the remote modem may adjust its transmit power accordingly.

A major advantage of a modem with transmit power level determination capability, in accordance with the present invention, is that it provides a mechanism to improve the received signal of the local modem. Under test conditions, it was found that the capability to decrease the transmit power significantly improved performance over most channel conditions. In many cases, the modem or other DCD was capable of operating at a higher bit rate with reduced error rates due to the reduced distortion caused by the transmit power reduction.

Another major advantage of a modem or other DCD with transmit power level determination capability, in accordance with the present invention, is that it also improves the received signal of the remote modem, because the reduced transmit power will decrease the echo into the remote modem's own receiver.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims.

We claim:

1. A method of determining a power level for data transmission and reception, from a transmitted probe signal received via a channel, the transmitted probe signal having a sequence of a plurality of tones having predetermined frequency, amplitude and phase characteristics, the transmitted probe signal having a first power level and a second power level, the transmitted probe signal received for a minimum duration for each of the first and second power levels to form a received probe signal having a plurality of sets of received probe tones, each set of received probe tones having a plurality of probe tone frequencies, the method comprising:

(a) determining an average probe signal level for each probe tone frequency of the received probe signal for the first power level, to form a first set of probe signal average power levels, and for the second power level, to form a second set of probe signal average power levels;

(b) determining an average noise level for a plurality of noise frequencies for the first power level, to form a first set of average noise levels, and for the second power level, to form a second set of average noise levels;

(c) determining a harmonic content parameter of the received probe signal, for the first power level and for the second power level;

(d) determining a receive signal power parameter from the second set of probe signal average power levels;

(e) determining a plurality of signal to distortion ratios, each of the plurality of signal to distortion ratios corresponding to a symbol rate and carrier frequency combination from a plurality of combinations of symbol rates and carrier frequencies, to form a set of signal to distortion ratios;

(f) determining a proportional noise parameter from the set of signal to distortion ratios;

(g) determining a signal to distortion threshold parameter, from the set of signal to distortion ratios; and (h) determining a transmit power level from the signal to distortion threshold parameter, the harmonic content parameter, the receive signal power parameter, and the proportional noise parameter.

2. The method of claim 1, wherein the determining a transmit power level step (h) further comprises:

(h1) determining a power decrease factor from the maximum of the harmonic content parameter, the signal to distortion threshold parameter, and the proportional noise parameter; and (h2) determining the transmit power level from the minimum of the receive signal power parameter and the power decrease factor.

3. The method of claim 1, wherein the determining an average probe signal level step (a) further comprises:

(a1) sampling a first set of received probe tones at the first power level to form a first set of sampled tones;

(a2) sampling a second set of received probe tones at the second power level to form a second set of sampled tones;

(a3) performing a sequence of Fourier transformations of the first set of sampled tones to form a plurality of sets of sequential Fourier transforms corresponding to each probe tone frequency and averaging a plurality of magnitudes of the sequential Fourier transforms corresponding to each probe tone frequency to form the first set of probe signal average power levels;

(a4) performing a sequence of Fourier transformations of the second set of sampled tones to form a plurality of sets of sequential Fourier transforms corresponding to each probe tone frequency and averaging a plurality of magnitudes of the sequential Fourier transforms corresponding to each probe tone frequency to form the second set of probe signal average power levels.

4. The method of claim 1, wherein the determining an average noise level for a plurality of noise frequencies step (b) further comprises:

determining a set of a plurality of corresponding noise frequencies, each of the plurality of corresponding noise frequencies having a predetermined frequency difference from a probe tone frequency of the plurality of tones of the received probe signal; and determining each of the first and second sets of average noise levels from an average of a plurality of samples of noise levels from the set of a plurality of corresponding noise frequencies.

5. The method of claim 4, wherein step (e) further comprises determining the plurality of signal to distortion ratios from:

$$\frac{1}{SDR} = e\left\{\frac{1}{f_{sym}} \int_{f_c - \frac{f_{sym}}{2}}^{f_c + \frac{f_{sym}}{2}} ln\left[\frac{N(f)}{S(f) + N(f)}\right] df\right\}$$

in which S(f) is a power spectral density of the received probe signal, N(f) is a power spectral density of the set of a plurality of corresponding noise frequencies, and in which $f_{sym}$ is a symbol rate and $f_c$ is a carrier frequency corresponding to a symbol rate and carrier frequency combination from a plurality of combinations of symbol rates and carrier frequencies.

6. The method of claim 4, wherein step (e) further comprises determining the plurality of signal to distortion ratios from:

$$\log(SDR) = \frac{1}{NumTones} \sum_i \log\left(S(f_i) \frac{TB_n B_p}{f_{sym}} + N(f_i)\right) - \log(N(f_i))$$

in which S(f) is a power spectral density of the received probe signal, N(f) is a power spectral density of the set of a plurality of corresponding noise frequencies, $f_{sym}$ is a symbol rate and $f_c$ is a carrier frequency corresponding to a symbol rate and carrier frequency combination from a plurality of combinations of symbol rates and carrier frequencies, $f_i$ is a frequency of an $i^{th}$ tone of the received probe signal, $\Sigma$ is a summation over values "i" such that $$f_c - \frac{f_{sym}}{2} \leq f_i \leq f_c + \frac{f_{sym}}{2},$$

NumTones is a number of tones of the probe signal plus a number of corresponding noise frequencies included in the summation, "$TB_n$" is a correction factor for a noise power spectrum, $B_n$ is a noise bandwidth parameter, and "$B_p/f_{sym}$" is a correction factor for a received probe signal power spectrum.

7. The method of claim 4, wherein the determining an average noise level step (b) further comprises:

(b1) sampling a first set of noise received together with the received probe signal having the first power level to form a first set of sampled noise;

(b2) sampling a second set of noise received together with the received probe signal having the second power level to form a second set of sampled noise;

(b3) performing a sequence of Fourier transformations of the first set of sampled noise to form a plurality of sets of sequential Fourier transforms for each corresponding noise frequency of the set of the plurality of corresponding noise frequencies and averaging a plurality of magnitudes of the sequential Fourier transforms for each corresponding noise frequency to form the first set of average noise levels;

(b4) performing a sequence of Fourier transformations of the second set of sampled noise to form a plurality of sets of sequential Fourier transforms for each corresponding noise frequency of the set of the plurality of corresponding noise frequencies and averaging a plurality of magnitudes of the sequential Fourier transforms for each corresponding noise frequency to form the second set of average noise levels.

8. The method of claim 1, wherein the determining the harmonic content parameter step (c) further comprises:

(c1) determining a magnitude of an amplitude of a harmonic tone frequency of the received probe signal, the harmonic tone frequency being an integer multiple of a probe tone frequency of the transmitted probe signal and further being a tone frequency omitted from the transmitted probe signal, for the first power level of the received probe signal, to form a first magnitude;

(c2) determining a magnitude of an amplitude of the harmonic tone frequency of the received probe signal, for the second power level of the received probe signal, to form a second magnitude; and (c3) forming a ratio of the first magnitude to the second magnitude.

9. The method of claim 1, wherein the determining the receive signal power parameter step (d) further comprises summing of squares of each of the average probe signal levels of the second set of probe signal average power levels and determining a noise threshold level.

10. The method of claim 1, wherein the determining the proportional noise parameter step (f) further comprises:

(f1) determining a first set of signal to distortion ratios corresponding to the first power level of the received probe signal;

(f2) determining a second set of signal to distortion ratios corresponding to the second power level of the received probe signal;

(f3) selecting a signal to distortion ratio from the first set of signal to distortion ratios corresponding to a symbol rate and carrier frequency combination to form a first SDR;

(f4) selecting a signal to distortion ratio from the second set of signal to distortion ratios corresponding to the symbol rate and carrier frequency combination to form a second SDR; and (f5) forming a ratio of the first SDR to the second SDR.

11. A modem for data transmission and reception, the modem having an initial training period for determining a transmit power level from a transmitted probe signal received via a channel, the transmitted probe signal having a sequence of a plurality of tones having predetermined frequency, amplitude and phase characteristics, the transmitted probe signal having a first power level and a second power level, the transmitted probe signal received for a minimum duration for each of the first and second power levels to form a plurality of sets of transmitted tones, the modem comprising:

a data access arrangement coupleable to the channel to receive the transmitted probe signal, to form a received probe signal;

an analog-digital converter coupled to the data access arrangement to sample and convert the received probe signal to form a plurality of sets of received probe tones; and a processor coupled to the analog-digital converter to receive the plurality of sets of received probe tones, the processor responsive to determine an average probe signal level for each tone frequency of the plurality of sets of received probe tones for the first power level, to form a first set of probe signal average power levels, and for the second power level, to form a second set of probe signal average power levels, and to determine an average noise level for a plurality of noise frequencies for the first power level, to form a first set of average noise levels, and for the second power level, to form a second set of average noise levels; the processor further responsive to determine a harmonic content parameter of the plurality of sets of received probe tones, for the first power level and for the second power level and to determine a receive signal power parameter from the second set of probe signal average power levels; the processor further responsive to determine a plurality of signal to distortion ratios, each of the plurality of signal to distortion ratios corresponding to a symbol rate and carrier frequency combination from a plurality of combinations of symbol rates and carrier frequencies, to form a set of signal to distortion ratios, and to determine a proportional noise parameter and a signal to distortion threshold parameter from the set of signal to distortion ratios; and the processor further responsive to determine a transmit power level from the signal to distortion threshold parameter, the harmonic content parameter, the receive signal power parameter, and the proportional noise parameter.

12. The modem of claim 11, wherein the processor is further responsive to determine a power decrease factor from the maximum of the harmonic content parameter, the signal to distortion threshold parameter, and the proportional noise parameter; and determine the transmit power level from the minimum of the receive signal power parameter and the power decrease factor.

13. The modem of claim 11, wherein:
the analog-digital converter samples a first set of received probe tones having the first power level to form a first set of sampled tones, and samples a second set of received probe tones having the second power level to form a second set of sampled tones; and
the processor is further responsive to perform a sequence of Fourier transformations of the first set of sampled tones to form a plurality of sets of sequential Fourier transforms corresponding to each probe tone frequency and averaging a plurality of magnitudes of the sequential Fourier transforms corresponding to each frequency to form the first set of probe signal average power levels, and to perform a sequence of Fourier transformations of the second set of sampled tones to form a plurality of sets of sequential Fourier transforms corresponding to each probe tone frequency and averaging a plurality of magnitudes of the sequential Fourier transforms corresponding to each frequency to form the second set of second probe signal average power levels.

14. The modem of claim 11, wherein the processor is further responsive to determine a set of a plurality of-corresponding noise frequencies, each of the plurality of corresponding noise frequencies having a predetermined frequency difference from a probe tone frequency of the plurality of tones of the received probe signal; and to determine each of the first and second sets of average noise levels from an average of a plurality of samples of noise levels from each of the plurality of corresponding noise frequencies.

15. The modem of claim 14, wherein the processor is further responsive to determine the plurality of signal to distortion ratios from:

$$\frac{1}{SDR} = e \left\{ \frac{1}{f_{sym}} \int_{f_c - \frac{f_{sym}}{2}}^{f_c + \frac{f_{sym}}{2}} ln\left[ \frac{N(f)}{S(f) + N(f)} \right] df \right\}$$

in which S(f) is a power spectral density of the received probe signal, N(f) is a power spectral density of the set of corresponding noise frequencies, and in which $f_{sym}$ is a symbol rate and $f_c$ is a carrier frequency corresponding to a symbol rate and carrier frequency combination from the plurality of combinations of symbol rates and carrier frequencies.

16. The modem of claim 14, wherein the processor is further responsive to determine the plurality of signal to distortion ratios from:

$$\log(SDR) = \frac{1}{NumTones} \sum_i \log\left( S(f_i) \frac{TB_n B_p}{f_{sym}} + N(f_i) \right) - \log(N(f_i))$$

in which S(f) is a power spectral density of the received probe signal, N(f) is a power spectral density of the set of a plurality of corresponding noise frequencies, $f_{sym}$ is a symbol rate and $f_c$ is a carrier frequency corresponding to a symbol rate and carrier frequency combination from a plurality of combinations of symbol rates and carrier frequencies, $f_i$ is the frequency of the $i^{th}$ tone of the probe signal, $\Sigma$ is a summation over values "i" such that $$f_c - \frac{f_{sym}}{2} \leq f_i \leq f_c + \frac{f_{sym}}{2},$$

NumTones is a number of tones of the probe signal plus a number of corresponding noise frequencies included in the summation, "$TB_n$" is a correction factor for a noise power spectrum, $B_n$ is a noise bandwidth parameter, and "$B_p/f_{sym}$" is a correction factor for a received probe signal power spectrum.

17. The modem of claim 14, wherein:
the analog-digital converter samples a first set of noise received together with the received probe signal having the first power level to form a first set of sampled noise, and samples a second set of noise received together with the received probe signal having the second power level to form a second set of sampled noise; and
the processor is further responsive to perform a sequence of Fourier transformations of the first set of sampled noise to form a plurality of sets of sequential Fourier transforms for each corresponding noise frequency of the set of the plurality of corresponding noise frequencies and averaging a plurality of magnitudes of the sequential Fourier transforms for each corresponding noise frequency to form the first set of average noise levels, and to perform a sequence of Fourier transformations of the second set of sampled noise to form a plurality of sets of sequential Fourier transforms for each corresponding noise frequency of the set of the plurality of corresponding noise frequencies and averaging a plurality of magnitudes of the sequential Fourier transforms for each corresponding noise frequency to form the second set of average noise levels.

18. The modem of claim 11, wherein the processor is further responsive to determine a magnitude of an amplitude of a harmonic tone frequency of the received probe signal, the harmonic tone frequency being an integer multiple of a probe tone frequency of the transmitted probe signal and further being a tone frequency omitted from the transmitted probe signal, for the first power level of the received probe signal, to form a first magnitude; to determine a magnitude of an amplitude of the harmonic tone frequency of the received probe signal, for the second power level of the received probe signal, to form a second magnitude; and to form a ratio of the first magnitude to the second magnitude to form the harmonic content parameter.

19. The modem of claim 11, wherein the processor is further responsive to determine the receive signal power parameter from a sum of squares of the average probe signal levels of the second set of probe signal average power levels and from a noise threshold level.

20. The modem of claim 11, wherein the processor is further responsive to determine a first set of signal to distortion ratios corresponding to the first power level of the received probe signal, and to determining a second set of signal to distortion ratios corresponding to the second power level of the received probe signal; to select a signal to distortion ratio from the first set of signal to distortion ratios corresponding to a symbol rate and carrier frequency combination to form a first SDR, and to select a signal to distortion ratio from the second set of signal to distortion ratios corresponding to the symbol rate and carrier frequency combination to form a second SDR; and to form a ratio of the first SDR to the second SDR to determine the proportional noise parameter.

* * * * *